(12) United States Patent
Nagai et al.

(10) Patent No.: US 7,376,705 B2
(45) Date of Patent: May 20, 2008

(54) METHOD AND SYSTEM FOR RESTRICTING CONTENT REDISTRIBUTION

(75) Inventors: Riko Nagai, Ichikawa (JP); Yoshiaki Maeda, Tokyo (JP); Toshihiro Inomata, Tokyo (JP); Takashi Kondo, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 580 days.

(21) Appl. No.: 10/735,290

(22) Filed: Dec. 12, 2003

(65) Prior Publication Data

US 2004/0215734 A1 Oct. 28, 2004

(30) Foreign Application Priority Data

Dec. 16, 2002 (JP) ............................. 2002-364272

(51) Int. Cl.
*G06F 15/16* (2006.01)

(52) U.S. Cl. ................. 709/206; 709/203; 709/205; 709/207; 709/225; 709/227; 709/229; 709/232

(58) Field of Classification Search ................ 709/203, 709/205, 225, 227, 229, 232, 206, 207
See application file for complete search history.

(56) References Cited

U.S. PATENT DOCUMENTS

| | | | | |
|---|---|---|---|---|
| 4,962,532 A * | 10/1990 | Kasiraj et al. ................. 726/6 |
| 5,875,296 A | 2/1999 | Shi et al. |
| 5,933,498 A * | 8/1999 | Schneck et al. ............... 705/54 |
| 5,949,877 A * | 9/1999 | Traw et al. ................... 713/171 |
| 6,226,618 B1 * | 5/2001 | Downs et al. ................. 705/1 |
| 6,230,186 B1 * | 5/2001 | Yaker ........................... 709/206 |
| 6,324,569 B1 * | 11/2001 | Ogilvie et al. ............... 709/206 |
| 6,701,347 B1 * | 3/2004 | Ogilvie ........................ 709/206 |
| 6,721,784 B1 * | 4/2004 | Leonard et al. ............. 709/206 |
| 6,983,367 B2 * | 1/2006 | Go et al. ..................... 713/168 |
| 7,032,011 B2 * | 4/2006 | Woodard et al. ............ 709/220 |
| 7,136,838 B1 * | 11/2006 | Peinado et al. ............... 705/59 |
| 7,228,334 B1 * | 6/2007 | Jordan, Jr. .................. 709/206 |
| 2001/0052077 A1 | 12/2001 | Fung et al. |
| 2002/0023138 A1 * | 2/2002 | Quine et al. ................. 709/206 |
| 2002/0087641 A1 * | 7/2002 | Levosky ...................... 709/206 |
| 2002/0103935 A1 * | 8/2002 | Fishman et al. ............. 709/246 |

(Continued)

FOREIGN PATENT DOCUMENTS

EP 0715243 A1 11/1995

(Continued)

OTHER PUBLICATIONS

European Office Action issued on May 24, 2006.

(Continued)

*Primary Examiner*—Michael Won
(74) *Attorney, Agent, or Firm*—Brinks Hofer Gilson & Lione

(57) ABSTRACT

A content server 10, in transmitting content appended with redistribution restriction information to a communication terminal 50, determines whether communication terminal 50 has a redistribution restriction function on the basis of identification data contained in a user agent header contained in a HTTP message transmitted from communication terminal 50. When the determination is affirmative, content server 10 transmits to communication terminal 50 the content via the Internet 20, gateway server 30, and mobile packet communication network 40.

24 Claims, 10 Drawing Sheets

U.S. PATENT DOCUMENTS

| | | | |
|---|---|---|---|
| 2002/0116382 A1* | 8/2002 | Koyama et al. | 707/9 |
| 2002/0120847 A1 | 8/2002 | Kamperman | |
| 2002/0129275 A1* | 9/2002 | Decuir | 713/201 |
| 2003/0046352 A1 | 3/2003 | Katsuda et al. | |
| 2003/0131060 A1* | 7/2003 | Hartselle et al. | 709/206 |
| 2003/0196091 A1 | 10/2003 | Raley et al. | |
| 2003/0221127 A1* | 11/2003 | Risan et al. | 713/201 |
| 2003/0233410 A1* | 12/2003 | Gusler et al. | 709/206 |
| 2004/0003030 A1* | 1/2004 | Abe | 709/203 |
| 2004/0010552 A1* | 1/2004 | Keohane et al. | 709/206 |
| 2004/0019644 A1* | 1/2004 | Fellenstein et al. | 709/206 |
| 2004/0064734 A1* | 4/2004 | Ehrlich | 713/201 |

FOREIGN PATENT DOCUMENTS

| | | |
|---|---|---|
| EP | 0 930 556 A2 | 7/1999 |
| EP | 0 978 839 A1 | 2/2000 |
| JP | 2000-305855 A | 11/2000 |
| JP | 2002-223476 | 1/2001 |
| JP | 2002-261748 | 5/2001 |
| JP | 2001-167016 A | 6/2001 |
| JP | 2002-269014 A | 9/2002 |
| WO | WO 02/057865 A2 | 7/2002 |

OTHER PUBLICATIONS

European Office Action for Application No. 03 028 627.2-2212, issued on Feb. 26, 2007.

Communication for Application No. 03 028 627.2-2212, issued on Jul. 9, 2007, (6 pages).

Communication from Japanese Patent Office for Application No. 2002-364272, issued on Sep. 4, 2007, (including translation )(2 pages).

* cited by examiner

| MACHINE TYPE NUMBER | MODEL NUMBER |
|---|---|
| . . . | . . . |
| . . . | . . . |
| AAAAAA | 111111 |
| AAAAAA | 121212 |
| BBBBBB | 222222 |
| . . . | . . . |
| . . . | . . . |

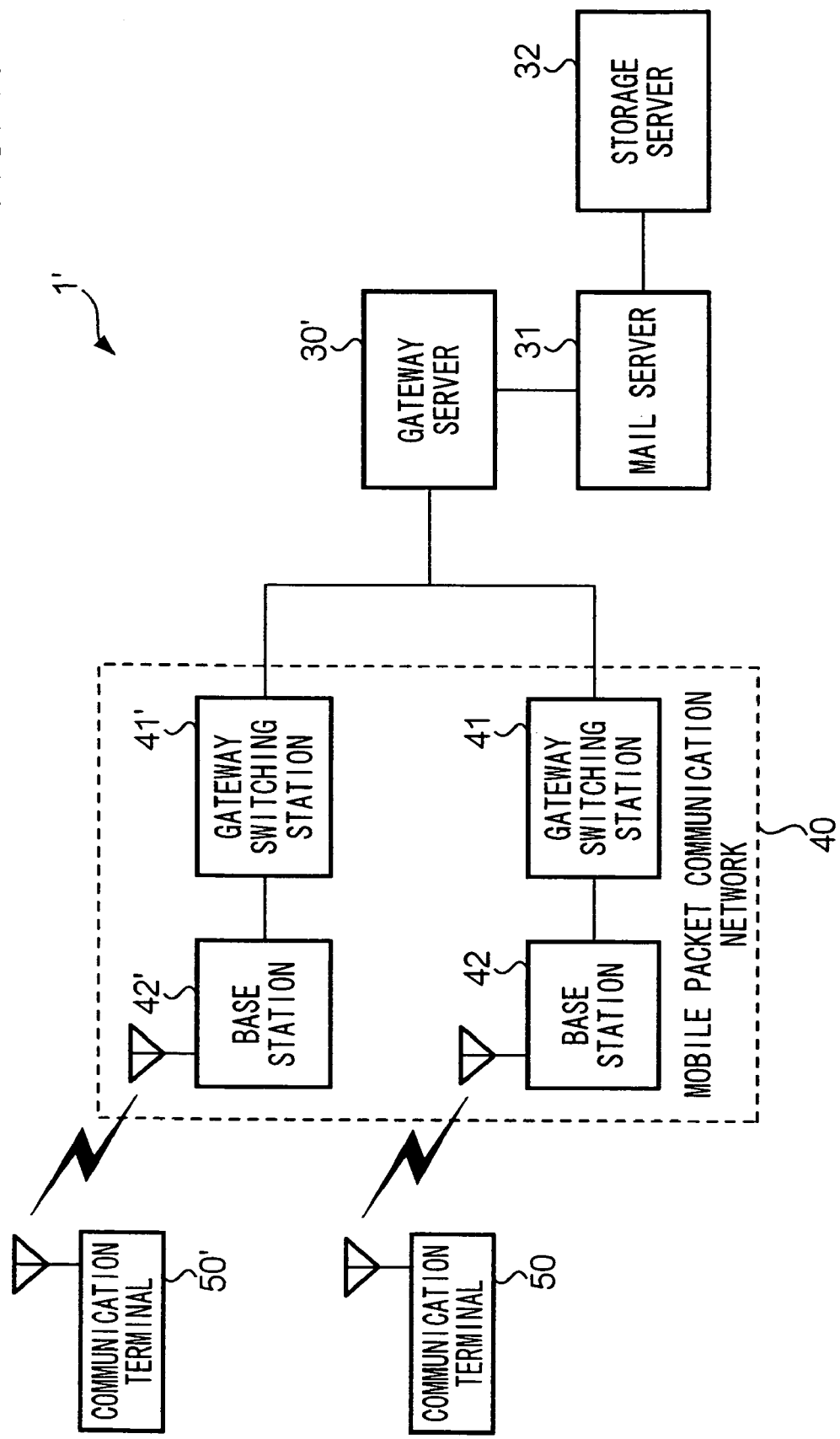

METHOD AND SYSTEM FOR RESTRICTING CONTENT REDISTRIBUTION

BACKGROUND

1. Technical Field

The present invention relates to a method and system for transmitting content via a communication device.

2. Background Art

There are now in place systems for enabling a communication device, such as a personal computer, to download via a communication medium, such as the Internet, a variety of content stored on a server, such as moving-image data, music-data, and the like. To access, download and use such content, a user must generally pay a charge to a data provider hosted; at the server.

However, once a user of a communication device has downloaded content upon payment of a charge, the user is able to distribute the content using wired or wireless communication, such as IrDA, without being routed via the original content server. In this way, downloaded content for which a fee is payable may be duplicated without payment of the fee. Such distribution is problematic in that copyright may be infringed, and royalty payments avoided.

Japanese Patent Application Laid-Open Publication No. 2001-167016 proposes a communication system for overcoming this problem. In the proposed system, distribution information is appended to content downloaded from a server to a communication device. When distribution information (hereinafter referred to as redistribution restriction information) is appended to content, secondary distribution or redirection of the downloaded content to another communication device is prohibited. Thus, when content having such information appended to it is once downloaded to a communication device, the communication device is unable to redistribute the content.

However, at the present time, a large number of communication devices are not equipped to process redistribution restriction information appended to downloaded content; and transition to use of devices equipped with such a function, especially in the case of mobile phone models that are already in widespread use, will inevitably be gradual.

In the interim, there remains a problem that communication devices not equipped with a function for processing redistribution restriction information appended to downloaded content will continue to be able to redistribute such content.

BRIEF SUMMARY

The present invention has been made in view of the problem stated above, and has as its object the prohibition, with a high degree of reliability, of redistribution of content downloaded to a communication device when the downloaded content has appended to it redistribution restriction information.

To solve the above problem, the present invention provides a communication device capable of transmitting content to another communication device, comprising: determining means for determining whether the another communication device has a function for restricting redistribution of content to which redistribution restriction information is appended; and transmitting means for transmitting the content to which the restriction information is appended when it is determined by the determining means that the another communication device to which the content is to be transmitted is provided with a function for restricting redistribution of the content. The communication device is, for example, a content server or a communication terminal which distributes content to the another communication device.

In one preferred embodiment, the determining means may comprise acquisition means for acquiring first identification information from the another communication device for identifying whether the another communication device has the function for restricting redistribution of the content; and memory storage means for storing second identification information for identifying communication devices having the function for restricting redistribution of the content. In this case, the determining means may determine whether the first identification information acquired by the acquisition means corresponds to any of second identification information stored in the memory storage means, and decides that the another communication device has the function for restricting redistribution of the content when it is determined that the first identification information acquired by the acquisition means corresponds to any of second identification information stored in the memory storage means.

In another preferred embodiment, the communication device may further comprise redistribution restriction information appending means for appending the redistribution restriction information to the content in response to a user instruction, and the transmitting means may transmit to the another communication device the content to which the redistribution restriction information is appended by the redistribution restriction information appending means.

Further, the present invention provides a transmission restriction method for use in a communication device capable of transmitting content to another communication device, comprising: an instruction detection step of detecting an instruction for transmitting the content to the another communication device where the content is appended with redistribution restriction information instructing the another communication device to restrict output of the content to an external device; a function detection step of detecting, after the instruction detection step, that the another communication device has a redistribution restriction function for restricting output of the content to an external device according to the redistribution restriction information; and a transmission step of transmitting, after the function detection step, the content to the another communication device. In one preferred embodiment, the transmission restriction method may comprise various steps performed by various means provided with the above communication device.

The present invention further provides a program for causing a communication device capable of transmitting content to another communication device to execute an instruction detection process of detecting an instruction for transmitting the content to the another communication device where the content is appended with redistribution restriction information instructing the another communication device to restrict output of the content to an external device; a function detection process of detecting, after the instruction detection process, that the another communication device has a redistribution restriction function for restricting output of the content to an external device according to the redistribution restriction information; and a transmission process of transmitting, after the function detection process, the content to the another communication device.

Still further, the present invention provides a recording medium that stores the above program.

According to the present invention, a communication device determines whether another communication device to which content is to be distributed has a redistribution restriction function for restricting output of the content to an external device according to redistribution restriction information appended to the content, before the communication device transmits to the another communication device the content to which the redistribution restriction information is assigned. Where it is determined that the another communication device has the redistribution restriction function, the communication device transmits the content to the another communication device.

BRIEF DESCRIPTION OF THE DRAWINGS

FIG. 13 is a block diagram showing an example of a modification of a configuration of a communication system according the present invention.

DETAILED DESCRIPTION OF THE DRAWINGS AND THE PRESENTLY PREFERRED EMBODIMENTS

Figure 1:
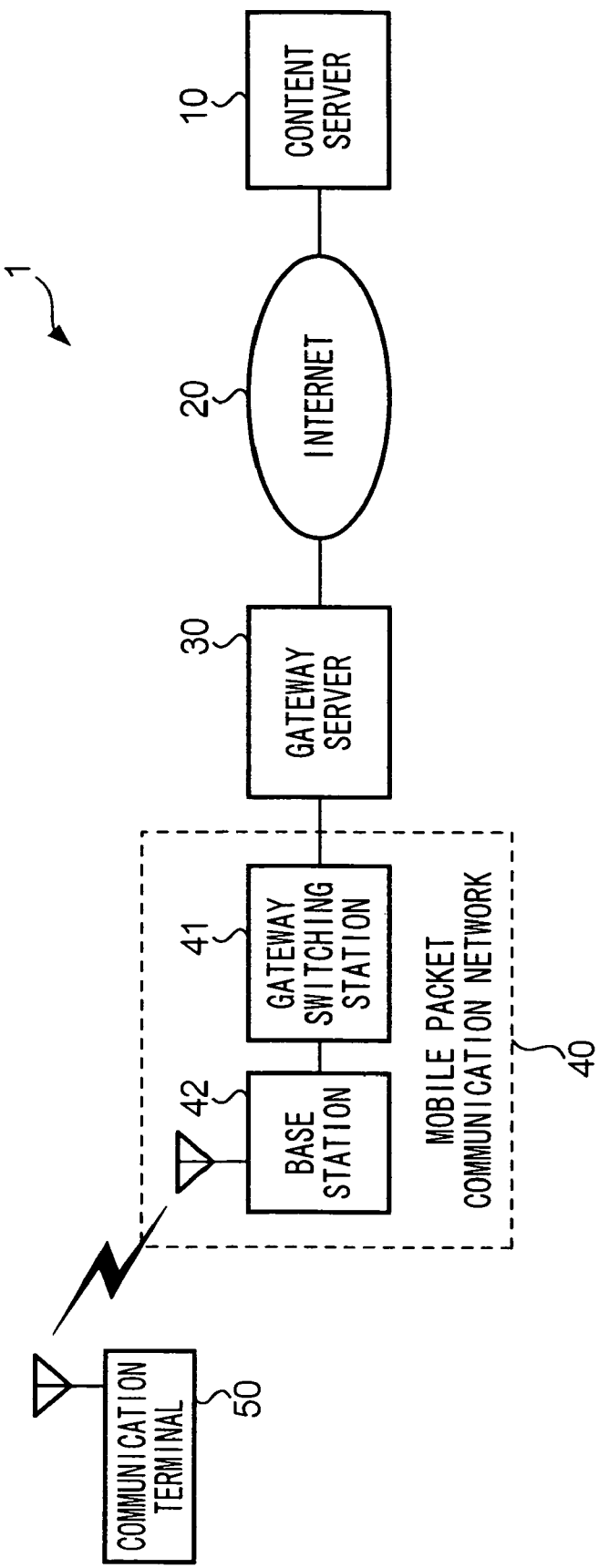
FIG. 1 is a block diagram showing an example of a configuration of a communication system according to one embodiment of the present invention.

Following, description is made of a preferred embodiment according to the present invention with reference to the attached drawings. In the drawings, like elements are denoted by like numerals.

A. First embodiment

1. Configuration
Configuration of Communication System 1:
FIG. 1 is a block diagram showing an example of a configuration of a communication system 1 according to a first embodiment of the present invention.

A mobile packet communication network 40 is a communication network for providing packet communication services to communication terminals 50 served by mobile packet communication network 40. Mobile packet communication network 40 comprises a gateway switching station 41 and a base station 42. Multiple base stations 42 are disposed in a communication service area of mobile packet communication network 40. Communication terminal 50 is able to perform wireless communication with a base station 42 when it is located in a wireless cell covered by a base station 42. Gateway switching station 41 relays communication between a base station 42 and gateway server 30.

Gateway server 30 relays data exchanged between mobile packet communication network 40 and the Internet 20.

Content server 10 stores content such as programs, image data, music data, and the like, and transmits to communication terminal 50 content requested from communication terminal 50. Hereinafter, transmission of content from content server 10 to communication terminal 50 will be simply referred to as "content distribution." Content server 10 is provided with the following configuration to enable it to carry out content distribution.

Figures 2, 3:
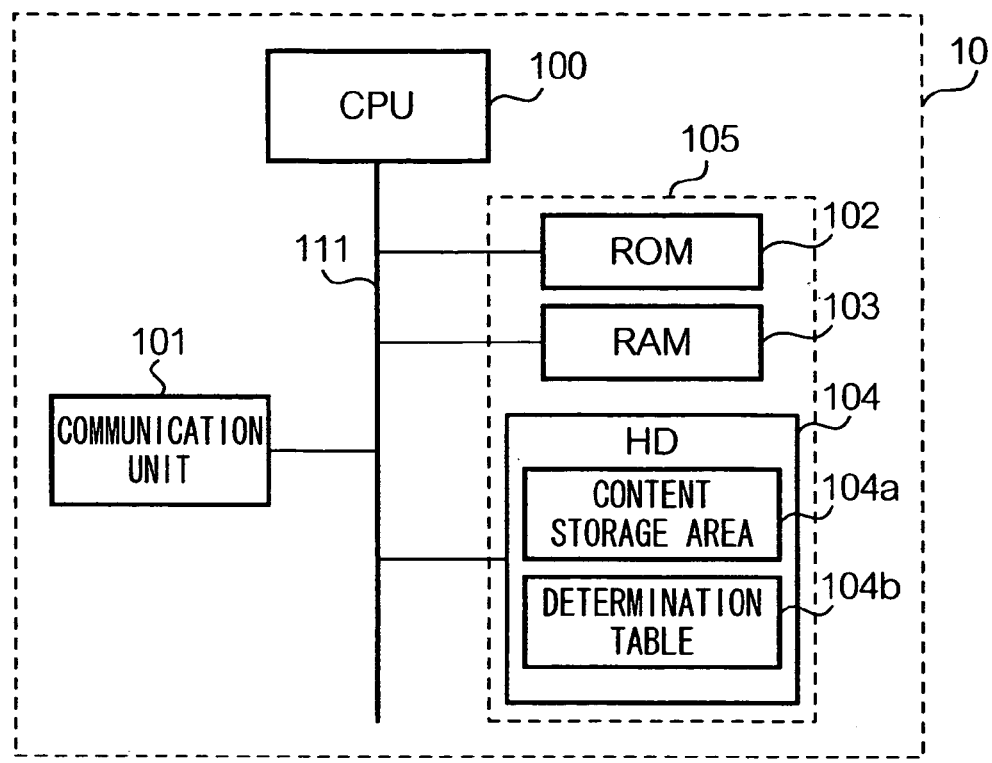
FIG. 2 is a block diagram showing an example of a hardware configuration of a content server according to the embodiment.
FIG. 3 is a diagram showing an example of a data configuration of a determination table according to the embodiment.
Figure 4:
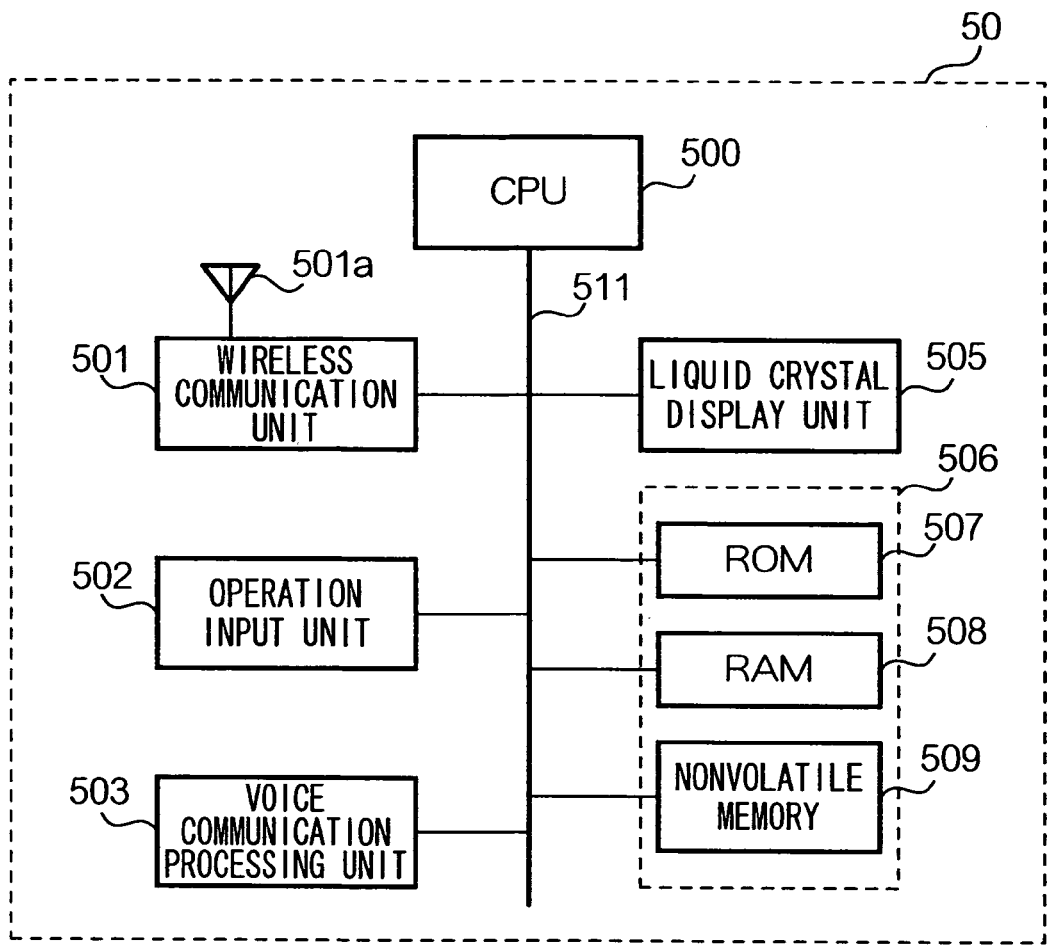
FIG. 4 is a block diagram showing an example of a hardware configuration of a communication terminal according to the embodiment.

Configuration of content server 10:
FIG. 2 is a block diagram showing an example of a hardware configuration of content server 10. As shown in the figure, device components are connected with one another through a bus 111; and each component of content server 10 exchanges data through bus 111.

Each component will now be described in detail.

A communication unit 101 controls communication between content server 10 and the Internet 20. Communication unit 101 transmits information supplied from CPU (Central Processing Unit) 100 to Internet 20, and passes to CPU 100 information received from Internet 20.

CPU 100 controls each component of content server 10 by executing programs stored in ROM (Read Only Memory) 102.

RAM (Random Access Memory) 103 is used as a work area for CPU 100, and temporarily stores data processed in various operations performed by CPU 100.

ROM 102 stores a redistribution restriction confirmation program for causing an operating system via CPU 100 to execute a redistribution restriction confirmation process. In the redistribution restriction confirmation process, upon receipt of a HTTP message transmitted from a communication terminal 50, CPU 100 determines whether a user agent header is contained in the HTTP message. When it is determined that a user agent header is contained in the message, CPU 100 acquires, from the user agent header, a machine type number and a model number of communication terminal 50. In a case that the acquired data is included in a determination table 104*b*, CPU 100 determines whether the communication terminal 50 is provided with a content redistribution restriction function. The redistribution restriction function is a function for use in a communication terminal for restricting redistribution of content downloaded from content server 10, when designated by the server 10, and will be described later in detail.

A machine type number and a model number are used to identify a version of a communication terminal, on the basis of which it can be determined whether the communication terminal is provided with a function for processing redistribution restriction information. Hereinafter, a machine type number and a model number of a communication terminal will be simply referred to as "identification data."

HD (Hard Disk) 104 of content server 10 comprises a content storage area 104*a*. Content storage area 104*a* stores content sets to be provided to communication terminal 50, with some content sets being assigned redistribution restriction information. The redistribution restriction information prohibits redistribution of a content set to which the information is assigned. In the present embodiment, a redistribution restriction flag '1' is appended to a content set to which the redistribution restriction information is assigned; and a redistribution restriction flag '0' is appended to a content set to which the redistribution restriction information is not assigned.

HD (Hard Disk) 104 further stores a determination table 104b. The determination table 104b stores identification data of communication terminals that are provided with the redistribution restriction function. The determination table 104b is used when CPU 100 performs the redistribution restriction confirmation process according to the program stored in ROM 102.

Configuration of communication terminal 50:

Communication terminal 50 functions to download content from content server 10, i.e., is able to receive content distributed by content server 10. Communication terminal 50 also functions to restrict redistribution of downloaded or distributed content.

In the description, "redistribution" is used when the following actions are performed by communication terminal 50:
1. content is transmitted to another communication terminal by attaching the content to an electronic mail;
2. content is uploaded to a separate server (not shown);
3. content is output to an external device using short range wireless communication; and
4. content is output to an external device via an external interface (not shown).

The redistribution restriction function is a function of communication terminal 50 for not redistributing content when it is determined, upon receipt of an instruction for redistributing the content from its user, that the redistribution restriction flag '1' is appended to the content.

The function of downloading content from content server 10 includes an identification data adding function. According to the function, a user agent header is appended to a HTTP message such as a HTTP request message, identification data of the requesting communication terminal 50 being set in the header, and the HTTP message is transmitted together with the user agent header to content server 10 when communication terminal 50 requests content server 10 to distribute content. The identification data to be set in the header is stored in advance in communication terminal 50.

Figure 5:
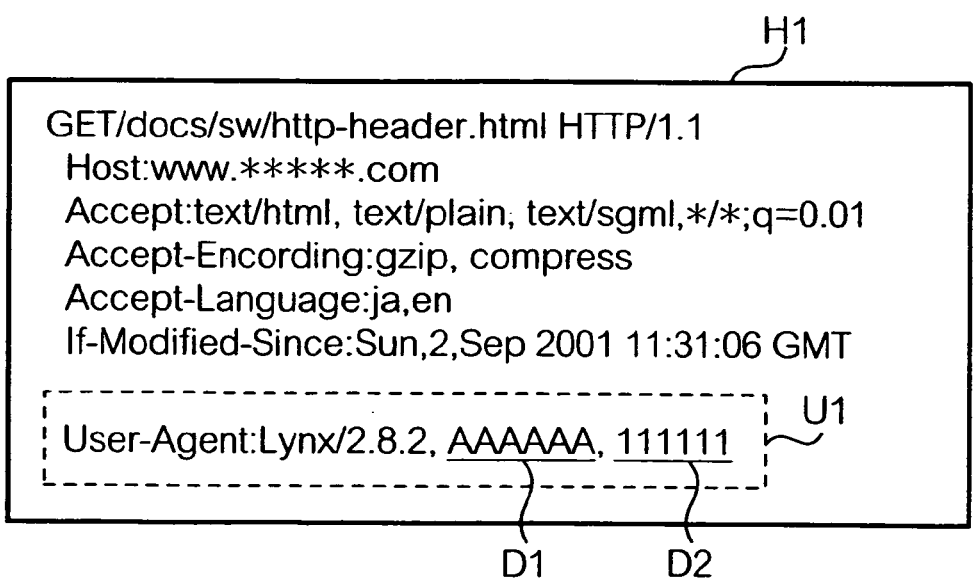
FIG. 5 is a diagram showing an example of a data content of a user agent header according to the embodiment.

FIG. 5 shows an example of a user agent header in which identification data is assigned. In the figure, a user agent header U1 is contained in a HTTP message H1. The user agent header U1 shows identification data of communication terminal 50 as machine type number D1 and model number D2.

Other components of the configuration of communication terminal 50 will not be described, because they are the same as those of a standard communication terminal.

2. Operation

When a user operates his/her communication terminal 50 having the above configuration to instruct the terminal 50 to access content server 10, communication terminal 50 initiates communication with content server 10. When the user further operates communication terminal 50 to request desired content, communication terminal 50 creates a HTTP request message including an instruction for downloading of content and a user agent header, the user agent header being appended with identification data of the communication terminal 50. Communication terminal 50 then transmits, to gateway server 30, the HTTP request message for content server 10, and gateway server 30 transmits the HTTP request message to content server 10.

CPU 100 of content server 10 receives the HTTP request message from communication terminal 50 and reads content according to the instruction contained in the HTTP request message from content storage area 104a. CPU 100 then determines whether redistribution restriction flag '1' is assigned to the requested content. When the determination is No, i.e., when redistribution restriction flag '0' is appended, CPU 100 transmits, to gateway server 30, a HTTP response containing the requested content.

Figure 6:
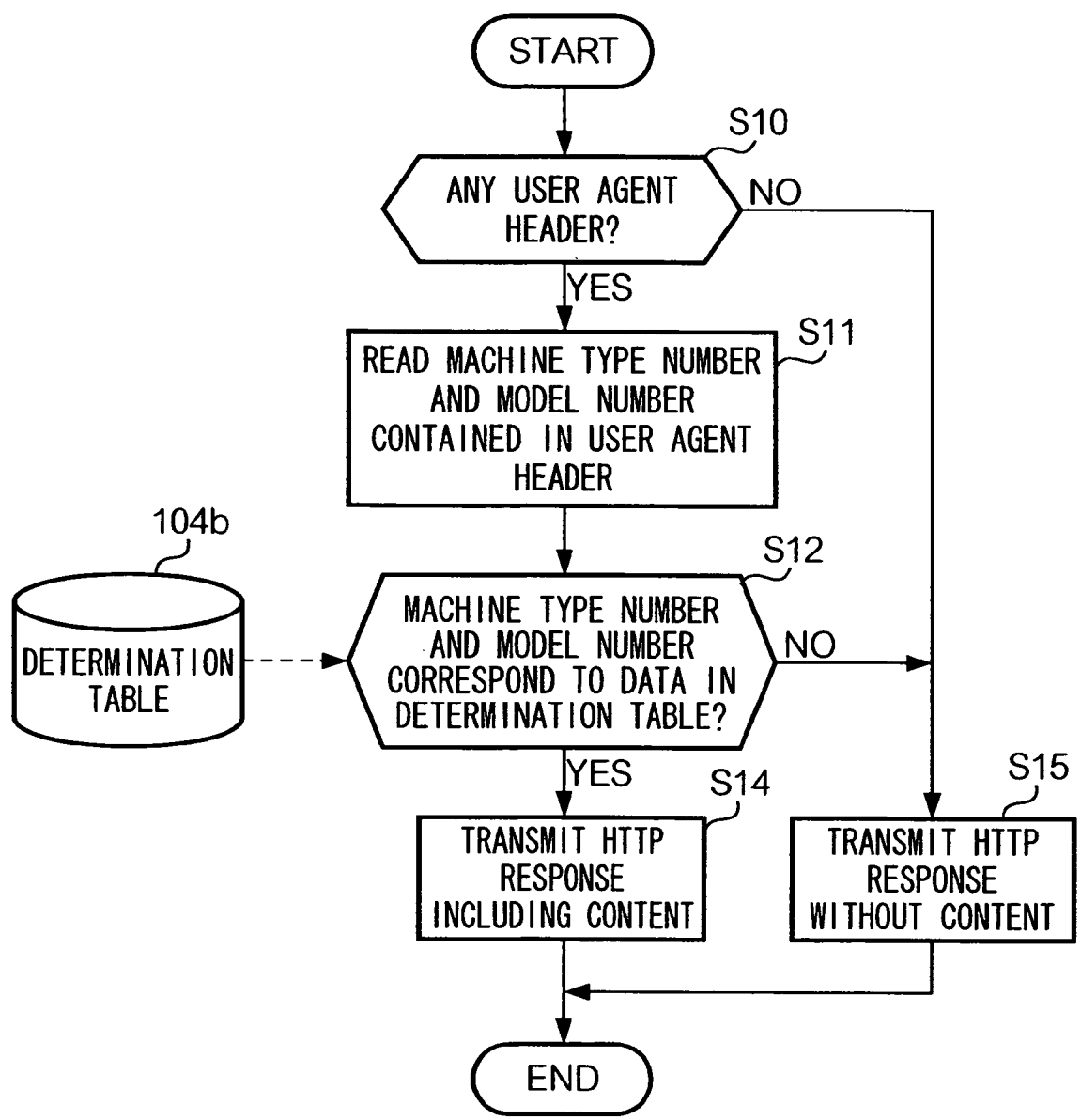
FIG. 6 is a flowchart illustrating an example operation of a redistribution restriction confirmation process executed by a CPU at the content server according to the embodiment.

When redistribution restriction flag '1' is assigned to the requested content, CPU 100 executes the redistribution restriction confirmation program stored in ROM 102, thereby performing a redistribution restriction confirmation process as described below. FIG. 6 is an example flowchart showing the redistribution restriction confirmation process.

CPU 100 first determines whether the HTTP request message contains a user agent header (Step S10). In this example, a user agent header has been appended to the HTTP request message by communication terminal 50. Therefore, the determination in Step S10 is Yes, and the routine proceeds to Step S11. In Step S11, CPU 100 acquires identification data of communication terminal 50 included in the user agent header. CPU 100 then determines whether the identification data corresponds to any one of data in the determination table 104b (see FIG. 3) stored in HD 104 (Step S12). The determination of Step S12 determines whether communication terminal 50 has a redistribution restriction function.

In this example, communication terminal 50 has a redistribution restriction function. Therefore, the determination in Step S12 is Yes, and CPU 100 then transmits to gateway server 30 a HTTP response containing the content as well as redistribution restriction flag '1' that is appended to the content (Step S14).

Gateway server 30 receives the HTTP response transmitted from content server 10 in Step S14 and transmits it to communication terminal 50.

Communication terminal 50, upon receiving the HTTP response, stores the content and the appended redistribution restriction flag '1' contained in the HTTP response. Where the user operates communication terminal 50 at a later time to instruct redistribution of the stored content, CPU 500 of communication terminal 50 determines whether the redistribution restriction flag '1' is appended to the stored content. In this example, the redistribution restriction flag '1' is appended to the stored content. Therefore, CPU 500 prohibits redistribution of the content by communication terminal 50, and displays on a liquid crystal display unit 505 a message that redistribution of the content is prohibited.

On the other hand, where a HTTP request not containing a user agent header is transmitted from a communication terminal (not shown), the determination in Step S10 is No. In another case, the determination is No in Step S12 where identification data of a communication terminal (not shown) does not correspond to any one of identification data included in the determination table 104b, even when a user agent header is contained in a HTTP request transmitted from the communication terminal. In these cases, the routine proceeds to Step S15. In Step S15, CPU 100 transmits a HTTP response not including the requested content but including a message that the requested content cannot be downloaded. A communication terminal, upon receiving the HTTP response, displays on its display unit a message that the requested content cannot be downloaded.

With the above configuration, content with redistribution restriction information appended is transmitted from content server 10 to communication terminal 50 only when communication terminal 50 is provided with the redistribution restriction function. Thus, redistribution of content can be controlled with high reliability, and copyright infringement or unpaid, illegal use of content can be prevented.

In another preferred embodiment, information other than the identification data may be referred to in determining whether communication terminal 50 has the redistribution restriction function. In this case, determination table 104b may store information other than machine type number data or model number data of communication terminal 50 if such information serves to determine whether communication terminal 50 has the redistribution restriction function.

Alternatively, communication terminal 50 may set, in a predetermined data area (hereinafter referred to as "identification area") of the user agent header of a HTTP request message, information indicating whether communication terminal 50 has the redistribution restriction function, and transmit the HTTP request message to content server 10. For example, information represented by '1' or '0' may be set in the identification area, '1' indicating that communication terminal 50 has the redistribution restriction function. In this case, when content server 10 receives a HTTP request message from communication terminal 50, the message containing request for downloading of content, CPU 100 of content server 10 determines whether a user agent header is contained in the HTTP request message. When it is determined that the user agent header is contained in the message, CPU 100 then determines whether '1' is set in the identification area of the user agent header. When it is determined that '1' is set, CPU 100 transmits the requested content to communication terminal 50. Thus, content server 10 determines with high reliability whether a communication terminal has the redistribution restriction function. In this example, content server 10 does not have to store data such as a determination table; a configuration of content server 10 may be simplified for realizing the redistribution restriction confirmation function.

B. Second Embodiment

Next, description will be given of a second preferred embodiment according to the present invention. In the second embodiment, a communication terminal 50' generates content such as a photo and assigns redistribution restriction information to the generated content. In this case, communication terminal 50' attaches such content to an electronic mail for transmission to a communication terminal 50.

Descriptions that are common to the first embodiment will not be repeated. The same reference numerals as those used in the first embodiment will be used to denote like elements.

1. Configuration

Figure 7:
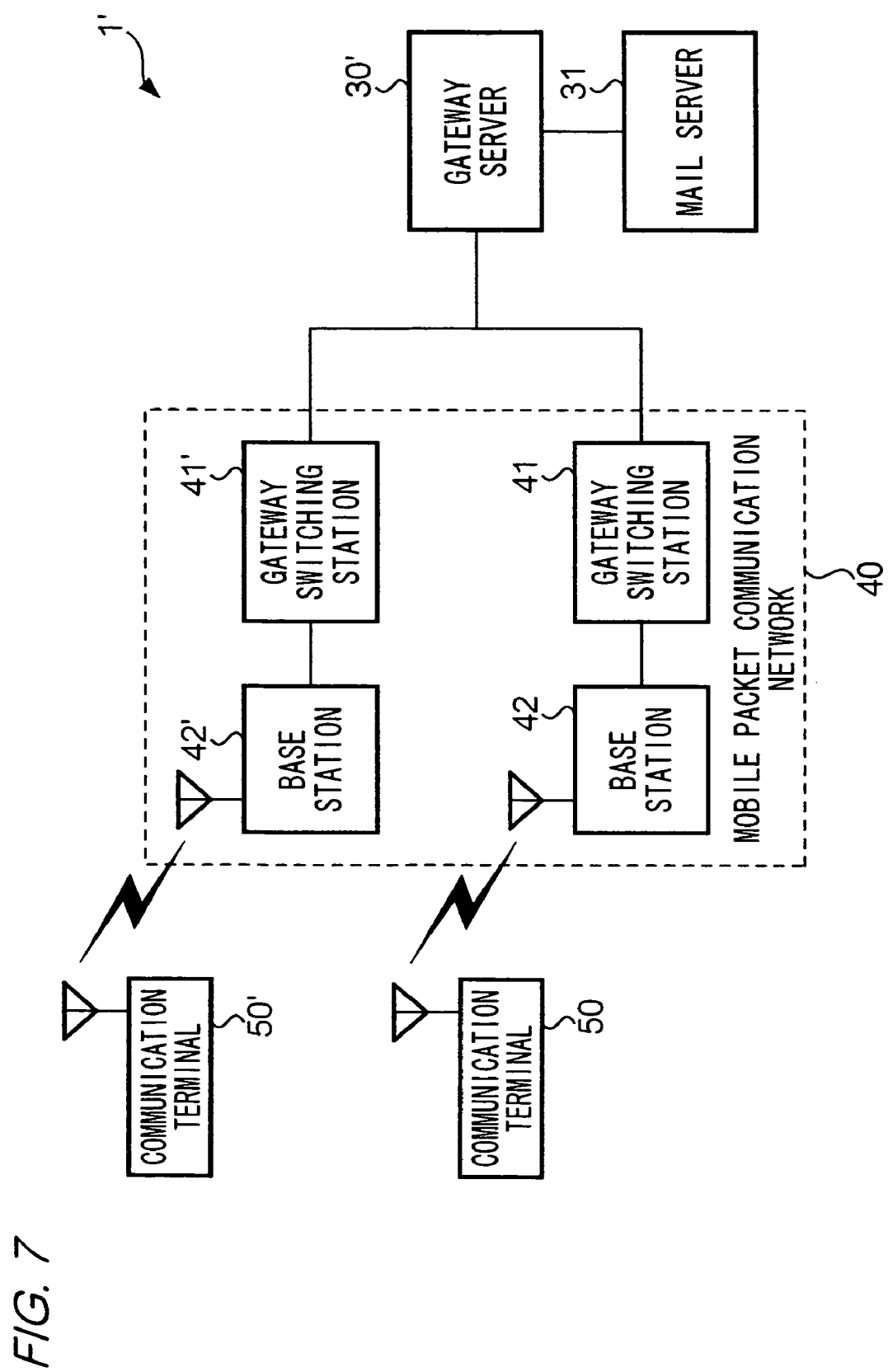
FIG. 7 is a block diagram showing an example configuration of a communication system according to a second embodiment of the present invention.

Configuration of Communication System 1:

FIG. 7 is a block diagram showing an example configuration of a communication system 1 according to the second embodiment of the present invention.

Mail server 31 receives and stores an electronic mail transmitted from communication terminal 50 via gateway server 30. The stored electronic mail is transmitted to a communication terminal 50 that has a designated electronic mail address. Mail server 31 stores only electronic mails for electronic mail addresses assigned to communication terminals served by mobile packet communication network 40. Description will be given later of specific functions provided with mail server 31 according to the present embodiment.

Gateway server 30 relays data exchanged between gateway switching station 41 of mobile packet communication network 40 and gateway switching station 41 of mobile packet communication network 40. The configuration of mobile packet communication network 40 is the same as that of the first embodiment. For convenience, a separate base station and gateway switching station are provided for communication terminal 50, being a base station 42 and gateway switching station 41.

Communication terminal 50 is capable of performing wireless communication when it is located in a wireless cell covered by base station 42. Communication terminal 50 performs packet communications with mail server 31 via base station 42, gateway switching station 41 and gateway server 30, thereby transmitting and receiving electronic mails. A detailed configuration of communication terminal 50 will be described later.

Communication terminal 50, as communication terminal 50, is also capable of performing packet communications with mail server 31 via base station 42, gateway switching station 41 and gateway server 30, thereby transmitting and receiving electronic mails. Communication terminal 50 is assigned an electronic mail address via which electronic mails are transmitted or received by communication terminal 50. The electronic mail address uniquely identifies communication terminal 50. Also, a domain name included in an electronic mail address uniquely identifies mail server 31. Communication terminal 50 has an identical redistribution restriction function to that of communication terminal 50 of the first embodiment. In other words, communication terminal 50 is capable of not redistributing redistribution-restricted content when receiving an instruction from a user for redistribution.

The other portions of the configuration of communication system 1 are the same as those of the first embodiment. In this embodiment, "distribution" refers to an action of transmitting from communication terminal 50 to communication terminal 50 content created by communication terminal 50 after the content is attached to an electronic mail. "Redistribution" is used in the same sense as in the first embodiment. Also, "redistribution restriction information" and "redistribution restriction function" are used in the same way as in the first embodiment.

Configuration of Mail Server 31:

Mail server 31 is provided with a determination table (not shown) similar to determination table 104b stored in content server 10 of the first embodiment.

Further, mail server 31 has a redistribution restriction confirmation function as described in the following. When mail server 31 receives a HTTP message from communication terminal 50 requesting transmission of a mail, it determines whether restricted distribution flag '1' is set in a predetermined data area (hereinafter referred to as "restricted distribution area") of the HTTP message, where the restricted distribution flag '1' indicates that the mail contains content to which redistribution restriction flag '1' is appended. When it is determined Yes, it is further determined, by referring to the determination table, whether communication terminal 50 is provided with the redistribution restriction function, the determination process being identical to that of the first embodiment. When it is determined that communication terminal 50 has the redistribution restriction function, mail server 31 transmits the electronic mail according to the HTTP message to communication terminal 50.

Figure 8:
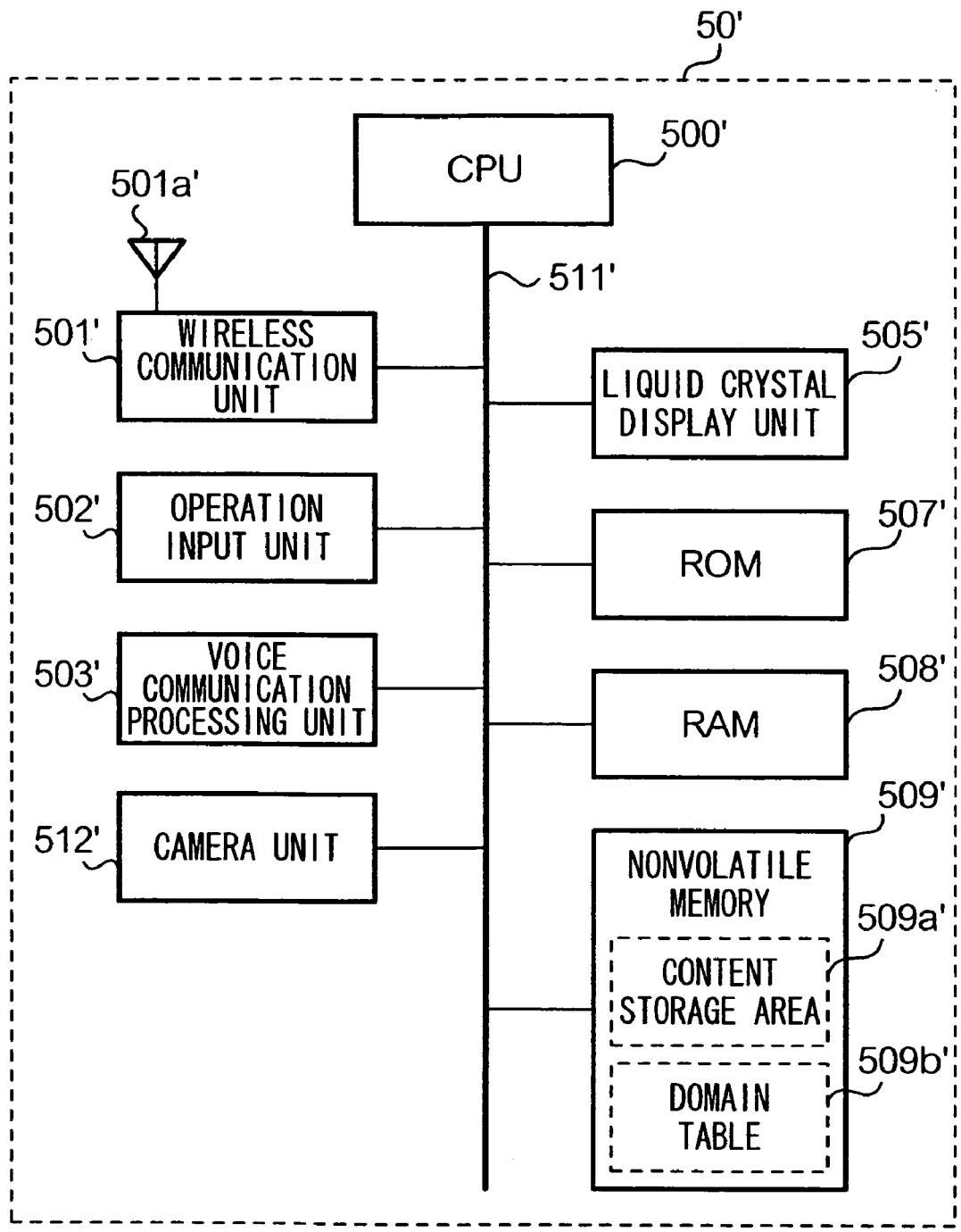
FIG. 8 is a block diagram showing an example of a hardware configuration of a communication terminal according to the second embodiment.

Configuration of Communication Terminal 50:

FIG. 8 is a block diagram showing an example of a hardware configuration of communication terminal 50 shown in FIG. 7.

As shown in the figure, communication terminal 50 comprises a camera unit 512. Camera unit 512 is provided with a CCD (Charge Coupled Device) camera (not shown) and a signal processing unit (not shown). When a user of communication terminal 50 performs an operation at an operation input unit 502 and shoots a picture using camera unit 512, image data is input in the CCD camera. The signal processing unit performs signal processing of the image data and supplies the processed signals as movie signals to CPU 500. CPU 500 causes a liquid crystal display unit 505 to display the supplied movie signals, and also stores, in a content storage area 509*a* of a nonvolatile memory 509, the movie signals as image data after associating a data name of the image data with the movie signals. In the present embodiment, the image data thus stored in nonvolatile memory 509 is treated as content.

ROM 507 stores a program for causing CPU 500 to perform a redistribution restriction adding process. In the redistribution restriction adding process, CPU 500 associates content with redistribution restriction flag '1' when receiving an instruction from a user to restrict redistribution of content stored in content storage area 509*a* by another communication terminal. CPU 500 also associates a self-assignment flag '1' with the content, self-assignment flag '1' indicating that redistribution restriction flag '1' is assigned at communication terminal 50. In contrast, content is not assigned self-assignment flag '1' when redistribution restriction flag '1' is assigned by content server 10 as in the first embodiment.

Further, ROM 507 of communication terminal 50 stores a redistribution restriction primary confirmation program for causing CPU 500 to perform a redistribution restriction primary confirmation process. The redistribution restriction primary confirmation process is performed as follows when an instruction is received to attach content to an electronic mail for transmission to communication terminal 50, where the content is appended to redistribution restriction flag '1' and self-assignment flag '1'. CPU 500 determines whether it is possible to verify whether communication terminal 50 has the redistribution restriction function. The determination is made on the basis of a domain name included in an electronic mail address of the destination communication terminal 50. When it is determined that it is possible to verify whether communication terminal 50 has the redistribution restriction function, CPU 500 does not append self-assignment flag '1' to the content but appends only redistribution restriction flag '1'. CPU 500 then attaches the content to the electronic mail and creates a HTTP message containing the electronic mail with the content attached. Restricted distribution flag '1' is set in the restricted distribution area of the HTTP message for transmission.

The domain name is used for determining whether it is possible to verify whether communication terminal 50 has the redistribution restriction function for the following reasons. Communication terminal 50 transmits an electronic mail to communication terminal 50 via mail server 31, and therefore, communication terminal 50 does not engage in direct communication with communication terminal 50. Given this situation, communication terminal 50 is unable to determine whether communication terminal 50 has the redistribution restriction function by using the same method as that used by content server 10 of the first embodiment. In the present embodiment, it is mail server 31 which determines whether communication terminal 50 has the redistribution restriction function. As described above, mail server 31 is uniquely identified by its domain name. Communication terminal 50 first determines, on the basis of a domain name, whether a mail server having the domain name, and intervening between electronic mail exchanges, is mail server 31, which has a function of determining whether communication terminal 50 has the redistribution restriction function. In a case that a mail server has the same function as mail server 31, mail server 31 determines whether communication terminal 50 has the redistribution restriction function by using the same method as that of the first embodiment.

Further, ROM 507 of communication terminal 50 stores a second redistribution restriction program for causing CPU 500 to perform a second redistribution restriction process that is different from the redistribution restriction process performed by communication terminal 50. In the second redistribution restriction process, when an instruction is given from a user for redistribution of content, CPU 500 determines whether the content is appended to redistribution restriction flag '1' and self-assignment flag '1'. When redistribution restriction flag '1' is appended to the content but self-assignment flag '1' is not, CPU 500 does not redistribute the content because the content has been distributed from a content server or from another communication terminal, by which redistribution of the content is prohibited.

Figure 9:
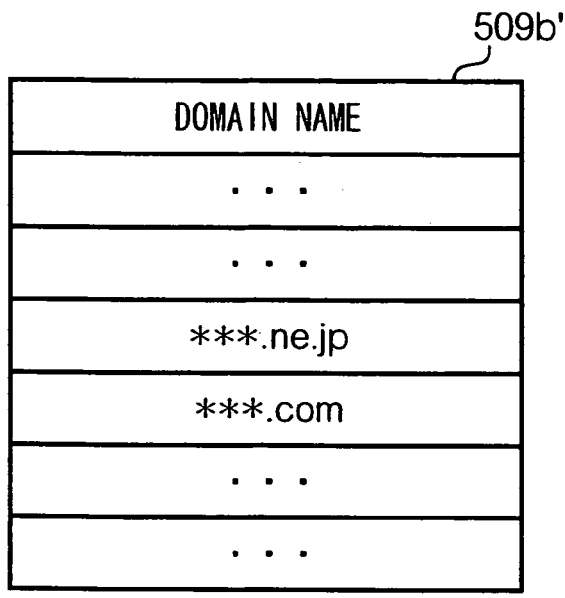
FIG. 9 is a diagram showing an example of a data configuration of a domain table according to the second embodiment.

Nonvolatile memory 509 stores a domain table 509*b* as shown in FIG. 9. Domain table 509*b* contains, as shown in the figure, data showing domain names included in electronic mail addresses. Domain names shown in domain table 509*b* are those assigned to mail servers 31 that are capable of verifying whether communication terminal 50 has the redistribution restriction function. Domain table 509*b* is used when CPU 500 performs the redistribution restriction primary confirmation process.

Description of the other components of the configuration will be omitted because communication terminal 50 has a similar configuration to that of a standard communication terminal.

2. Operation

A user operates an operation input unit 502 of communication terminal 50 to shoot a photo using camera unit 512. The user again operates operation input unit 502 of communication terminal 50 to store, in content storage area 509*a* of nonvolatile memory 509, image data (hereinafter referred to as "content") stored by camera unit 512 and a data name of the image data (hereinafter referred to as "content name") in correspondence with each other.

Figure 10:
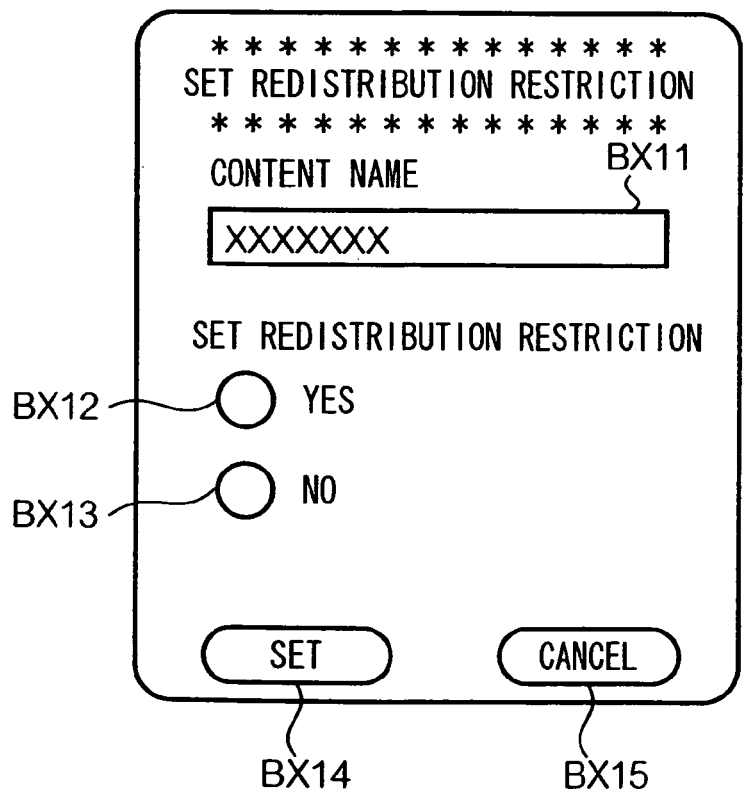
FIG. 10 is a diagram showing an example screen image displayed on a liquid crystal display unit of a communication terminal according to the second embodiment.

In this example, the user then performs a predetermined operation at operation input unit 502 of communication terminal 50. Upon reception of the operation input, CPU 500 displays on liquid crystal display unit 505, a redistribution set screen as shown in FIG. 10. On the screen, the user enters, in an input box BX11, a content name of desired content from among content created by communication terminal 50 and stored in content storage area 509*a*. When entering a content name, a user may perform a predetermined operation thereby displaying on liquid crystal display unit 505 a list of content names of content stored in content storage area 509*a*. The user then may select a content name corresponding to a desired content instead of typing a content name in input box BX11.

Since the user wishes to restrict redistribution of the selected content in this case, the user enters a check mark in a check box BX12. In contrast, in a case that redistribution is not restricted, a check mark is entered in a check box BX13. The user then presses a "set" button BX14. CPU 500' then extracts content having the content name entered in input box BX11 from content storage area 509a. CPU 500 then associates redistribution restriction flag '1' and self-assignment flag '1' with the extracted content, for storage in content storage area 509a.

Figure 11:
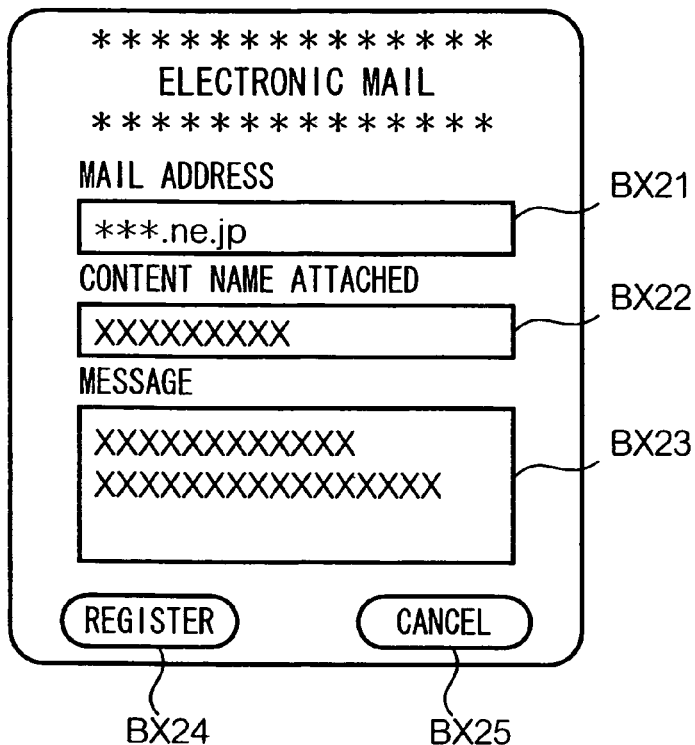
FIG. 11 is a diagram showing an example of a screen displayed on a liquid crystal display unit of the communication terminal according to the second embodiment.

When the user subsequently performs an operation at operation input unit 502 of communication terminal 50 to create a new electronic mail, CPU 500 displays an entry screen for a new electronic mail, as shown in FIG. 11, on liquid crystal display unit 505. On the screen, the user enters an electronic mail address corresponding to communication terminal 50 in an input box BX21 and a content name of content for transmission in an input box BX22. The user then enters a message in an input box BX23. When the user pushes down a register button BX24 after completing the electronic mail, CPU 500 executes the redistribution restriction primary confirmation program stored in ROM507, thereby performing the redistribution restriction primary confirmation process in the following.

Figure 12:
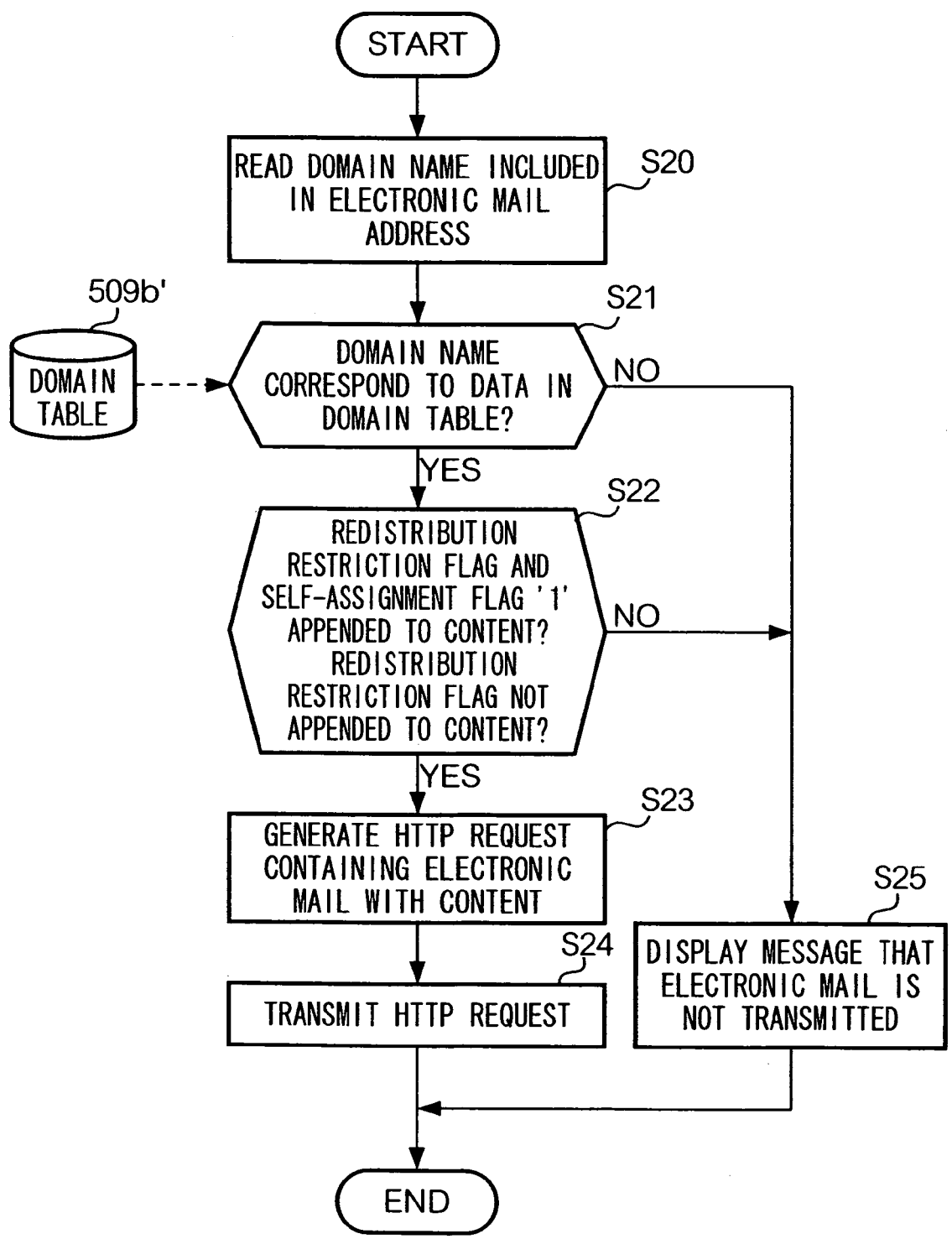
FIG. 12 is a flowchart illustrating an example operation of a redistribution restriction primary confirmation process executed by a CPU at the communication terminal according to the second embodiment.

FIG. 12 is a flowchart showing an example flow of the redistribution restriction primary confirmation process.

In Step S20, CPU 500 of communication terminal 50 reads data showing a domain name contained in the electronic mail address (an electronic mail address of communication terminal 50) entered in input box BX21. Next in Step S21, CPU 500 determines whether the read domain name corresponds to any one of domain names stored in domain table 509b (see FIG. 9). Since, in this example, the data of the domain name included in the electronic mail address corresponding to communication terminal 50 is stored in domain table 509b, the determination in Step S21 is Yes. CPU 500 then reads content having the content name entered in the input box BX22 from content storage area 509a. Further, CPU 500 determines whether each of redistribution restriction flag '1' and self-assignment flag '1' is appended to the content (Step S22).

There are three possible cases in relation to the determination of Step S22. In a first case, the content is appended with both redistribution restriction flag '1' and self-assignment flag '1'. This means that redistribution restriction flag '1' is appended to the content by communication terminal 50. Therefore, the content may be transmitted or distributed to another communication terminal even though the content is appended with redistribution restriction flag '1'. In a second case, the content is appended only with redistribution restriction flag '1'. In this case, the content cannot be transmitted or redistributed to another communication terminal because the restriction on redistribution of the content is assigned by another communication terminal, not by communication terminal 50. In a third case, the content is not appended with redistribution restriction flag '1', and no restriction is imposed in transmitting the content to another communication terminal. In the determination of Step S22, Yes is determined in the above first and the third cases, and No is determined in the above second case.

In this example, it is assumed that redistribution restriction flag '1' and self-assignment flag '1' are appended. Therefore, Yes is determined in Step S22, and the routine proceeds to Step S23. In Step S23, CPU 500 associates the content only with redistribution restriction flag '1', but not with self-assignment flag '1', and attaches the content to an electronic mail. CPU 500 then generates a HTTP mail transmission request message containing the electronic mail with the content being attached. CPU 500 also sets in the restriction distribution area of the HTTP message restricted distribution flag '1' indicating that redistribution restriction flag '1' is appended to the content. In Step S24, CPU 500 transmits the HTTP message to gateway server 30 via base station 42 and gateway switching station 41.

In a case where redistribution restriction flag '1' is not appended to the content, Yes is determined in Step S22, but no flag is appended to the content in Step S23. In this case, CPU 500 sets in the restriction distribution area of the HTTP message restricted distribution flag '0' indicating that redistribution restriction flag '1' is not appended to the content. In Step S24, CPU 500 transmits thus generated HTTP message to gateway server 30 via base station 42 and gateway switching station 41.

In contrast, in a case where No is determined in Step S22, the content cannot be redistributed. The routine then proceeds to Step S25, where CPU 500 does not transmit an electronic mail but displays on liquid crystal display unit 505 a message that the electronic mail cannot be transmitted.

The determination of Step S21 is No when an electronic mail address designated by a user corresponds to a communication terminal on which it is not possible to determine whether the communication terminal has the redistribution restriction, i.e., in a case that a domain name included in the electronic mail address does not correspond to any one of the domain names stored in domain table 509b. The routine then proceeds to Step S25, and CPU 500 does not transmit an electronic mail but displays on liquid crystal display unit 505 a message that the electronic mail cannot be transmitted.

The foregoing describes how CPU 500 of communication terminal 50 performs a redistribution restriction primary confirmation process.

After Step S24 is executed by CPU 500', gateway server 30 receives and transmits the HTTP message to mail server 31. Mail server 31, upon receiving the HTTP message, temporarily stores the electronic mail contained in the message in correspondence with a designated electronic mail address. Mail server 31 also temporarily stores a value of the restricted distribution flag set in the restriction distribution area of the HTTP message. Mail server 31 then transmits a notice of receipt to a communication terminal 50 having the destination electronic mail address, via gateway server 30, gateway switching station 41, and base station 42.

Communication terminal 50, upon receiving the notice of receipt, transmits to mail server 31 a HTTP request message containing a request for acquiring the electronic mail, via base station 42, gateway switching station 41, and gateway server 30. Communication terminal 50 appends a user agent header containing the machine type number and model number of communication terminal 50 to the HTTP request message in the same way as in the first embodiment.

Mail server 31, upon receiving the HTTP request message from communication terminal 50, reads the value of the restricted distribution flag temporarily stored, and determines whether the value is '1'. In this case, Yes is determined because the value '1' is assigned by communication terminal 50 when the HTTP request is generated in Step S23 of FIG. 12. Mail server 31 then performs the redistribution restriction confirmation process in the same way as content server 10 in the first embodiment. When it is determined that communication terminal 50 has the redistribution restriction function as a result of the process, mail server 31 transmits to gateway server 30 a HTTP response containing the electronic mail corresponding to the electronic mail address contained in the HTTP request message transmitted from communication terminal 50.

Gateway server 30 then transmits the HTTP response to communication terminal 50. Communication terminal 50, upon receiving the HTTP response, stores content attached to the electronic mail as well as the electronic mail contained in the HTTP response.

When a user of communication terminal 50 attempts to redistribute content thus received, to which content redistribution restriction flag '1' is appended, communication terminal 50 prohibits the content from being redistributed, as in the first embodiment.

In a case where the value of the attached restricted distribution flag is not '1', a HTTP request message transmitted from communication terminal 50 contains an electronic mail without content to which redistribution restriction flag '1' being appended. In this case, mail server 31 does not perform the redistribution restriction confirmation process, but transmits to gateway server 30 a HTTP response containing the electronic mail corresponding to the electronic mail address contained in the HTTP request message.

In a case where mail server 31 determines that communication terminal 50 does not have the redistribution restriction function as a result of the redistribution restriction confirmation process, the content attached to the electronic mail is deleted, and a HTTP response message containing only the body of the electronic mail message is generated and transmitted to communication terminal 50 via gateway server 30. The HTTP response message also contains a message that the attached content has been deleted. Communication terminal 50, upon receiving the HTTP response message, stores the electronic mail contained in the HTTP response message, and displays the message that the attached content has been deleted.

As has been described, communication terminal 50 performs the redistribution restriction primary confirmation process before transmitting an electronic mail having redistribution-restricted content attached, to confirm that a mail server through which the electronic mail is transmitted is a mail server 31 that has the redistribution restriction confirmation function, where the restriction on the redistribution of the attached content is imposed by communication terminal 50. The redistribution restriction confirmation process is then performed by mail server 31, thereby detecting that communication terminal 50 has the redistribution restriction function. As a result, redistribution-restricted content is distributed only to a communication terminal having the redistribution restriction function. Thus, the redistribution of content can be restricted with high reliability.

In the present embodiment, CPU 500 of communication terminal 50 performs the redistribution restriction primary confirmation process after an electronic mail is created and before the electronic mail is transmitted to communication terminal 50. In another embodiment, CPU 500' may perform the redistribution restriction primary confirmation process while a user is composing an electronic mail. For example, the redistribution restriction primary confirmation process may be performed upon detecting that a content name of content having redistribution restriction flag '1' and self-assignment flag '1' appended is entered in input box BX22 and a destination electronic mail address is entered in input box BX21 of the new electronic mail screen of FIG. 11.

Further, in the present embodiment, the redistribution restriction primary confirmation process is performed at communication terminal 50, and the redistribution restriction confirmation process is then performed at mail server 31. It is also possible to not perform the redistribution restriction confirmation process at mail server 31. In this case, it has to be confirmed that domain names shown by data stored in domain table 509*b* stored in communication terminal 50 always correspond to communication terminals having the redistribution restriction function.

Also, mail server 31 may transmit a HTTP response to communication terminal 50 containing a message that the received electronic mail cannot be transmitted to communication terminal 50 because communication terminal 50 does not have the redistribution restriction function, instead of deleting content attached to an electronic mail as in the above embodiment. In this way, the electronic mail with its attached content is stored in mail server 31 for a predetermined period. Thus, it becomes possible for a user of communication terminal 50 to switch to another communication terminal 50 having the redistribution restriction function and to receive the electronic mail at the switched communication terminal 50.

3. Modifications of Second Embodiment

Modification 1:

In one embodiment, content may be stored in a server other than mail server 31. Specifically, when an electronic mail with content attached is transmitted from communication terminal 50 to an electronic mail address of communication terminal 50, the attached content only may be stored in a server other than mail server 31.

For example, a storage server 32 may be connected to mail server 31 as shown in FIG. 13. Storage server 32 is a computer having a communication function and a data storage function, and detailed description thereof will be omitted.

When mail server 31 receives from communication terminal 50 a HTTP message containing an electronic mail with content to which redistribution restriction flag '1' is appended, the server 31 stores, in storage server 32, the content attached to the electronic mail contained in the HTTP message as in the above second embodiment. Mail server 31 further stores an URL (Uniform Resource Locator) of storage server 32 in correspondence with the content. Mail server 31 then transmits a notice of receipt to a communication terminal 50 having an electronic mail address designated as the destination of the electronic mail, via gateway server 30, gateway switching station 41, and base station 42.

Communication terminal 50, upon receiving the notice of receipt, transmits a HTTP request message to mail server 31 via base station 42, gateway switching station 41, and gateway server 30, the request message containing a request for acquiring the electronic mail. Here, the HTTP request message contains a user agent header having identification data of communication terminal 50 appended, as in the first embodiment. Mail server 31, upon receiving the HTTP request message, performs the above redistribution restriction confirmation process. When it is determined that communication terminal 50 has the redistribution restriction function, mail server 31 extracts an electronic mail that is associated with an electronic mail address contained in the HTTP request message. Mail server 31 then transmits to gateway server 30 a HTTP response containing the electronic mail with details of a URL where content attached to the electronic mail is stored.

Figure 14:
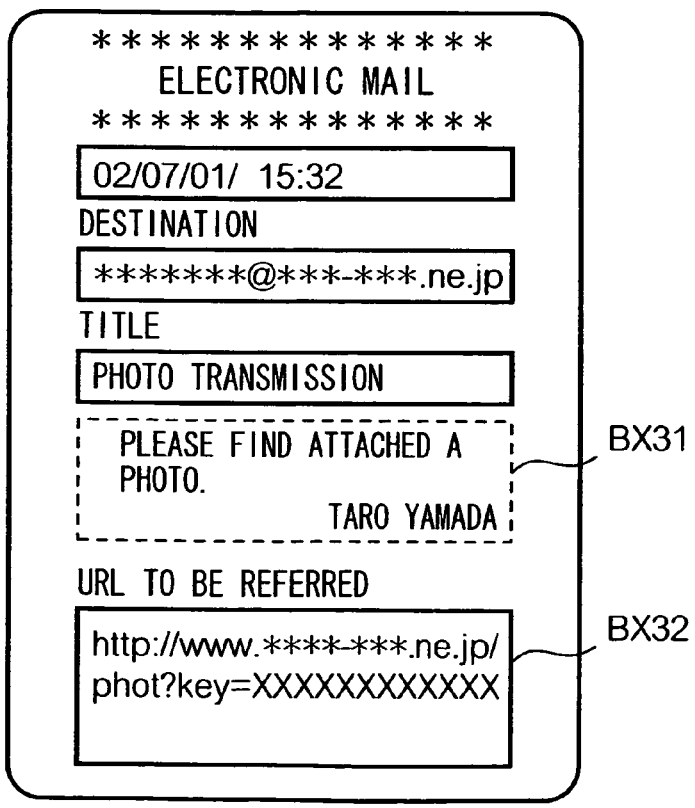
FIG. 14 is a diagram showing an example screen image displayed on a liquid crystal display unit of the communication terminal according to the modification of the present invention.

Gateway server 30 transmits the HTTP response to communication terminal 50. Communication terminal 50, upon receiving the HTTP response, stores the electronic mail contained in the HTTP response and displays the mail content as shown in FIG. 14. In the figure, the body of the electronic mail is displayed in a box BX31, and a URL of a storage location of content is displayed in a box BX32.

When a user selects the URL in box BX32, communication terminal 50, according to the URL, accesses storage server 32 via base station 42, gateway switching station 41, gateway server 30, and mail server 31, and acquires the content stored in storage server 32.

In a case where mail server 31 determines in the redistribution restriction confirmation process that communication terminal 50 has no redistribution restriction function, mail server 31 extracts an electronic mail corresponding to an electronic mail address contained in the HTTP request message, and transmits to gateway server 30 a HTTP response containing the extracted electronic mail. Here, the electronic mail does not contain the URL information showing a storage location of the content attached to the electronic mail.

Gateway server 30 transmits the HTTP response to communication terminal 50. Communication terminal 50, upon receiving the HTTP response, stores the electronic mail contained in the HTTP response and displays only the body of the electronic mail.

With the above configuration, only communication terminal 50 having the redistribution restriction function is permitted to acquire content to which the redistribution restriction information is appended.

Modification 2:

In another preferred embodiment, a short range wireless communication function may be used by communication terminal 50 in transmitting content to communication terminal 50, whereas, in the above embodiment, communication terminal 50 transmits content to communication terminal 50 via mobile packet communication network 40.

In the present modification, each of communication terminal 50 and communication terminal 50 has a short range wireless communication unit for transmitting and receiving data at short range, in addition to the above configuration, and performs operations as follows.

When a user performs the same operations as performed in the above second embodiment at communication terminal 50, and causes content to be appended with redistribution restriction flag '1' and self-assignment flag '1', the user then requests communication terminal 50 to transmit the content via the short range wireless communication unit to communication terminal 50. CPU 500 of communication terminal 50 transmits a communication to communication terminal 50, and receives a communication header from communication terminal 50. CPU 500 then determines whether the received communication header is appended with certification information. In a case where it is determined that the certification information is appended to the communication header, CPU 500 determines that communication terminal 50 has the redistribution restriction function. CPU 500 then does not append self-assignment flag '1' but appends only redistribution restriction flag '1' to the content as in the second embodiment, and transmits the content to communication terminal 50 via the short range wireless communication unit.

In a case where a user of communication terminal 50 inputs an instruction for transmitting content to a communication terminal having no redistribution restriction function and redistribution restriction certifying function via the short range wireless communication unit, CPU 500 of communication terminal 50 determines that a communication header received from the communication terminal is not appended with certification information, and therefore determines that the communication terminal does not have the redistribution restriction function. As a result, CPU 500 does not transmit the content to the communication terminal.

Modification 3:

Communication terminal 50 may transmit content to an external device (not shown) mounted on communication terminal 50. Examples of such an external device include a computer device, a movie output device, an external storage device, a game device, and the like, that are connected to communication terminal 50.

In the present modification, communication terminal 50 comprises an external interface (not shown) for performing communication with an external device in addition to the above configuration. Further, communication terminal 50 and an external device connected to the terminal 50 perform operations such as the following.

A user attaches an external device (not shown) to communication terminal 50. The user then performs an operation at communication terminal 50, as in the second embodiment to have the terminal 50 append redistribution restriction flag '1' and self-assignment flag '1' to the content. The user then inputs an instruction for transmitting the content to the external device. CPU 500 of communication terminal 50 then transmits to the external device an inquiry signal via an external-interface. The external device receives, via the interface (not shown), the inquiry signal. Since the external device has the redistribution restriction function, the external device, in response to the inquiry signal, transmits a response signal via the interface. Communication terminal 50, upon receiving the response signal, determines that the external device has the redistribution restriction function, and transmits the content to the external device after appending redistribution restriction flag '1' but not appending self-assignment flag '1'.

In a case where an external device has no redistribution restriction function nor response function, the external device is unable to transmit a response signal in response to an inquiry signal transmitted from communication terminal 50. In this case, communication terminal 50 is unable to receive a response signal responding to the inquiry signal, and therefore does not transmit the content to such an external device.

In still another preferred embodiment, a digital certificate may be issued in advance to an external device having the redistribution restriction function from a trustworthy public authorization agency, and the external device may store the issued digital certificate in advance. Such an external device, upon receiving an inquiry signal transmitted from communication terminal 50, transmits the digital certificate to communication terminal 50. Communication terminal 50, upon receiving the digital certificate, determines that the external device has the redistribution restriction function. Communication terminal 50 then does not append self-assignment flag '1' but appends only redistribution restriction flag '1' to the content for transmission to the external device. In a case where communication terminal 50 is unable to receive from the external device any digital certificate, communication terminal 50 determines that the external device has no redistribution restriction function, and therefore does not transmit the content to the external device.

C. Modifications

In the foregoing, embodiments of the present invention have been described. The present invention can be implemented in various other embodiments without departing from the main characteristic of the invention. For example, modifications such as the following are possible.

1. In the first embodiment, gateway server 30, instead of content server 10, may perform the redistribution restriction confirmation process.

Specifically, gateway server 30 instead of content server 10 is provided with determination table 104b and the redistribution restriction confirmation program. When content server 10 transmits a HTTP message containing content to which redistribution restriction flag '1' is appended, content server 10 sets restricted distribution flag '1' in the restriction distribution area of the HTTP message in the same way as communication terminal 50 in the second embodiment. Gateway server 30 upon receiving the HTTP message from content server 10, performs the redistribution restriction confirmation process when a value of the restricted distribution flag is '1'. When it is determined as a result of the process that communication terminal 50 has the redistribution restriction function, gateway server 30 transmits the HTTP request message to content server 10. In a case where it is determined that communication terminal 50 does not have the redistribution restriction function, gateway server 30 does not transmit the HTTP request message to content server 10, and transmits to communication terminal 50 a message that the HTTP request message has been rejected.

Also in the second embodiment, gateway server 30 may perform the redistribution restriction confirmation process in place of communication terminal 50.

In a configuration where gateway server 30 performs the redistribution restriction confirmation process as described above, content server 10 or mail server 31 do not need to have determination table 104b and the redistribution restriction confirmation program. Thus, the configuration of these servers can be simplified.

2. In the above first and second embodiments, information on the number of times content is permitted to be redistributed (restriction number) may be appended to content in addition to redistribution restriction flag '1'. Further, information on restriction number may be appended to the redistribution restriction flag. Specifically, the redistribution restriction flag is set as '1' where the restriction number is 0 times; the redistribution restriction flag is set as '2' where the restriction number is 10 times; the redistribution restriction flag is set as '3' where the restriction number is 20 times. When this is applied to the above first embodiment, content server 10 stores, in content storage area 104a, content corresponding to a redistribution restriction flag which has a value corresponding to a desired restriction number. Content server 10 then performs the redistribution restriction confirmation process, and transmits content to a communication terminal when it is confirmed that a request for downloading of the content is made by a communication terminal 50 having the redistribution restriction function.

Communication terminal 50 is supposed to have the following redistribution restriction function when such a redistribution restriction flag as described above is used. When a user enters an instruction at communication terminal 50 for redistributing content to which the redistribution restriction flag is appended, with the flag being set a value specifying the restriction number, communication terminal 50 performs the redistribution restriction process in a manner such as the following. Where the redistribution restriction flag is '1', the redistribution restriction process as described in the first embodiment is performed. Where the redistribution restriction flag is '2', the number of times that the content is redistributed (redistribution count) is increased by one every time the content is redistributed, and the redistribution count is recorded in a predetermined data area of the content. When the redistribution count adds up to 10, distribution of the content is no longer allowed. Likewise, where the redistribution restriction flag is '3', redistribution of the content is no longer allowed when the redistribution count adds up to 20. Communication terminal 50 performs the redistribution restriction process such as described above, thereby realizing the redistribution restriction function for restricting the number of times that content is redistributed. A program for causing CPU 500 of communication terminal 50 to realize the redistribution restriction function may be stored in ROM 507 or nonvolatile memory 509.

In one embodiment, the redistribution count may be increased by a number of communication terminals to which the content is redistributed from communication terminal 50 where the content is redistributed to a plurality of communication terminals. Also, the redistribution count may be increased when another communication terminal redistributes the content to communication terminal 50. Here, the redistribution count is increased every time the content is redistributed to another communication terminal, and the redistribution restriction is no longer performed on a communication terminal basis. Thus, the redistribution restriction can be reliably enforced.

Further, information on the redistribution restriction number may be appended to content in addition to the redistribution restriction information. A predetermined data area may be assigned to be used for a replay restriction number flag, in addition to a data area for the redistribution restriction flag.

Still further, the redistribution count may be increased on a communication terminal basis and/or not on a communication terminal basis.

Further, information on redistribution period, i.e., a period during which the content may be redistributed may be appended to redistribution-restricted content. In this case, content including such redistribution period information is transmitted and received among communication terminals.

3. Further, an output level of the content may be imposed in redistributing content. In this case, redistribution restriction information including a permitted output pattern which is a combination of different output permission levels, is appended to content. Here, output permission levels include a plurality of levels relating to an extent to which redistribution is restricted or permitted. For example, where content is image data, an output permission level pertaining to external storage or an output permission level pertaining to image output may be set as output permission levels.

For example, where output permission levels are set for external storage, levels L1-L4 may be set as output permission levels: L1 not permitting redistribution of content; L2 permitting transmission of content attached to an electronic mail; L3 permitting uploading of content to a server; and L4 permitting outputting of content to an external device via an external interface.

Where output permission levels are set for image output, levels L11-L13 may be set: L11 not permitting outputting of content to an external monitor connected via an external interface; L12 permitting analog general purpose output; and L13 permitting digital general purpose output.

In this case, one of such output permission levels L1 to L4, L11 to L13 may be applied to content stored in content server 10 as its redistribution restriction flag. Also, identification data of communication terminals having redistribution restriction functions may be stored in determination table 104b of content server 10 according to an output permission level appended to content. Further, content server 10 may have a function of determining whether a communication terminal 50 requesting downloading of content has a redistribution restriction function for realizing redistribution control according to the present modification by checking whether identification data of the communication terminal 50 corresponds to any one of the data stored in determination table 104*b*.

According to the present modification, content can be redistributed so as to conform to usage of the content.

4. In another modification, it may be determined whether communication terminal 50 has the redistribution restriction function in the following way.

For example, in the first embodiment, communication terminal 50 may transmit, to gateway server 30, specification information indicating that communication terminal 50 has the redistribution restriction function in performing communication with content server 10. Gateway server 30 then stores the transmitted specification information in correspondence with communication terminal 50. When communication terminal 50 transmits a HTTP request message to content server 10, gateway server 30 receives the HTTP request message and transmits the specification information to content server 10 together with the HTTP request message. Every time gateway server 30 receives a HTTP request message, gateway server 30 transmits to content server 10 the specification information together with the HTTP request message. Content server 10, upon receiving the specification information together with the HTTP request message, determines that communication terminal 50 has the redistribution restriction function. If the HTTP request message is received without the specification information, content server 10 determines that communication terminal 50 does not have the redistribution restriction function.

In one embodiment, gateway server 30 may transmit the HTTP request message to content server 10 in a case that it receives specification information from communication terminal 50. On the other hand, in a case that specification information is not transmitted from communication terminal 50, gateway server 30 does not transmit to content server 10 a HTTP request message from communication terminal 50.

Thus, reliability is ensured when content with redistribution restriction flag '1' is transmitted only to communication terminals having the redistribution restriction function.

5. In the above embodiments, the redistribution restriction flag is appended to content. Instead, a predetermined data area of content may be used as an area for redistribution restriction flag.

It is therefore intended that the foregoing detailed description be regarded as illustrative rather than limiting, and that it be understood that it is the following claims, including all equivalents, that are intended to define the spirit and scope of this invention.

The invention claimed is:

1. A communication device capable of transmitting content to another communication device, comprising:
   determining means for determining whether said another communication device has a function for restricting redistribution of content according to redistribution restriction information whereby the another communication device prevents transmitting the content, which was transmitted from the communication device, to a third communication device based on said redistribution restriction information; and
   transmitting means for transmitting said content to which said redistribution restriction information is appended when it is determined by said determining means that said another communication device to which said content is to be transmitted is provided with a function for restricting redistribution of said content.

2. A communication device according to claim 1, further comprising: redistribution restriction information appending means for appending said redistribution restriction information to said content in response to a user instruction, wherein said transmitting means transmits to said another communication device said content to which said redistribution restriction information is appended by said redistribution restriction information appending means.

3. A communication device according to claim 1, wherein said redistribution restriction information comprises information sent from the another communication device to the communication device.

4. A communication device according to claim 3, wherein said redistribution restriction information comprises identification information of the another communication device.

5. A communication device according to claim 1, further comprising message transmitting means for transmitting a message to said another communication device indicating that the content is not being distributed when it is determined by said determining means that said another communication device to which said content is to be transmitted is not provided with the function for restricting redistribution of said content.

6. A communication device according to claim 1, further comprising analysis means for analyzing whether the content is subject to restriction in distribution; and
   wherein the determining means determines whether said another communication device has a function for restricting redistribution of content if the content is subject to restriction in distribution.

7. A communication device according to claim 1, wherein the communication device comprises a server.

8. A communication device according to claim 7, wherein the communication device comprises an electronic mail server.

9. A communication device according to claim 8, wherein the content comprises at least a portion of an e-mail transmitted to the electronic mail server.

10. A communication device according to claim 8, wherein the another communication terminal comprises a destination communication terminal, the destination communication terminal identified in the e-mail a recipient of the e-mail, and
    wherein the destination communication terminal comprises the redistribution restriction information.

11. A communication device according to claim 7, wherein the communication device comprises a content server.

12. A communication device according to claim 1, further comprising:
    inquiring means for sending an inquiry to the another communication device to inquire as to whether the another communication device restricts distribution of content; and
    receiving means for receiving from the another communication device a response to the inquiry including the redistribution restriction information.

13. A communication device according to claim 1, wherein the redistribution restriction information is included with a request from the another communication terminal for the content.

14. A communication device according to claim 1, wherein the function for restricting redistribution comprises preventing distribution of the content to the third communication device.

15. A communication device according to claim 1, wherein the function for restricting redistribution comprises limiting distribution of the content to external devices to a predetermined number of times.

16. A communication device capable of transmitting content to another communication device, comprising:
- determining means for determining whether said another communication device has a function for restricting redistribution of content to which redistribution restriction information is appended; and
- transmitting means for transmitting said content to which said restriction information is appended when it is determined by said determining means that said another communication device to which said content is to be transmitted is provided with a function for restricting redistribution of said content,
- wherein said determining means comprises:
- acquisition means for acquiring first identification information from said another communication device for identifying whether said another communication device has said function for restricting redistribution of said content; and
- memory storage means for storing second identification information for identifying communication devices having said function for restricting redistribution of said content,
- wherein said determining means determines whether said first identification information acquired by said acquisition means corresponds to any of second identification information stored in said memory storage means, and decides that said another communication device has said function for restricting redistribution of said content when it is determined that said first identification information acquired by said acquisition means corresponds to any of second identification information stored in said memory storage means.

17. A transmission restriction method for use in a communication device capable of transmitting content to another communication device, comprising:
- detecting an instruction for transmitting said content to said another communication device where said content is appended with redistribution restriction information instructing said another communication device to restrict output of said content to an external device;
- detecting, after detecting an instruction for transmitting said content, that said another communication device has a redistribution restriction function for restricting output of said content to an external device according to said redistribution restriction information whereby said another communication device prevents transmitting the content, which was transmitted from the communication device, to the external device according to said redistribution restriction information; and
- transmitting, after detecting that said another communication device has a redistribution restriction function, said content to said another communication device.

18. A transmission restriction method according to claim 17, wherein said redistribution restriction information comprises information sent from the another communication device to the communication device.

19. A transmission restriction method according to claim 17, further comprising transmitting a message to said another communication device indicating that the content is not being distributed when it is detected that said another communication device to which said content is to be transmitted is not provided with the function for restricting redistribution of said content.

20. A transmission restriction method according to claim 17, further comprising analyzing whether the content is subject to restriction in distribution; and
- wherein the detecting that said another communication device has a redistribution restriction function is performed if the content is subject to restriction in distribution.

21. A transmission restriction method according to claim 17, further comprising:
- sending an inquiry to the another communication device to inquire as to whether the another communication device restricts distribution of content; and
- receiving from the another communication device a response to the inquiry including the redistribution restriction information.

22. A transmission restriction method according to claim 17, wherein the function for restricting redistribution comprises preventing distribution of the content to the third communication device.

23. A transmission restriction method according to claim 17, wherein the function for restricting redistribution comprises limiting distribution of the content to external devices to a predetermined number of times.

24. A transmission restriction method for use in a communication device capable of transmitting content to another communication device, comprising:
- determining whether said another communication device has a function for restricting redistribution of content to which redistribution restriction information is appended; and
- transmitting said content to which said restriction information is appended when it is determined that said another communication device to which said content is to be transmitted is provided with a function for restricting redistribution of said content,
- wherein determining comprises:
- acquiring first identification information from said another communication device for identifying whether said another communication device has said function for restricting redistribution of said content; and
- storing second identification information for identifying communication devices having said function for restricting redistribution of said content,
- wherein determining whether said another communication device has a function for restricting redistribution of content to which redistribution restriction information is appended comprises determining whether said acquired first identification information corresponds to any of the stored second identification information, and deciding that said another communication device has said function for restricting redistribution of said content when it is determined that said acquired first identification information corresponds to any of the stored second identification information.

* * * * *